Nov. 16, 1965  R. J. ELGER  3,217,527
METAL EXTRUSION PRESS WITH MANDREL COOLING DEVICE
Filed Jan. 18, 1963  5 Sheets-Sheet 2
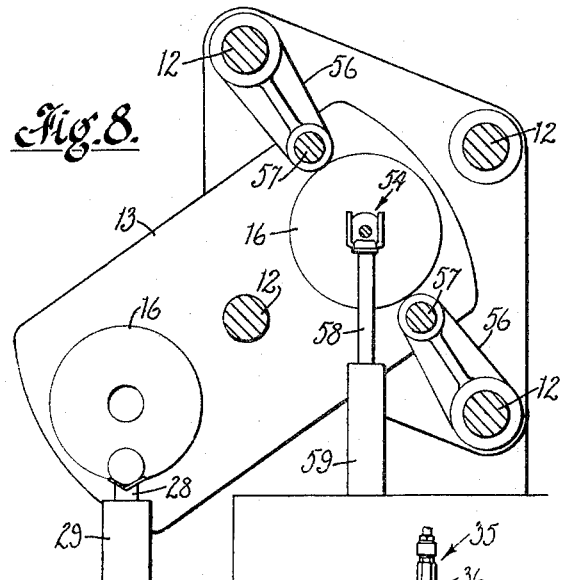
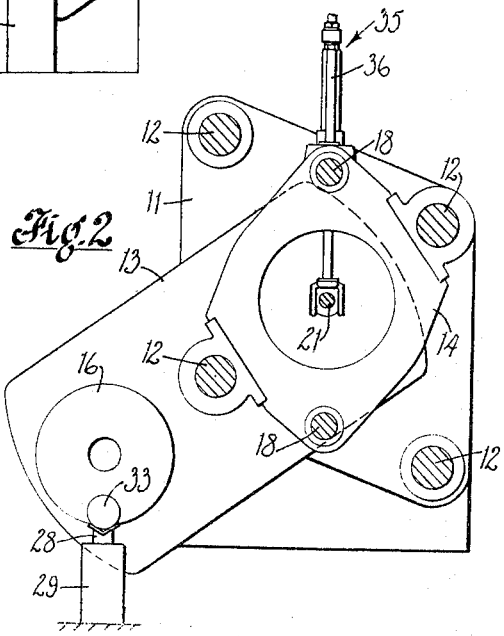
INVENTOR
RONALD JOHN ELGER
BY
ATTORNEYS

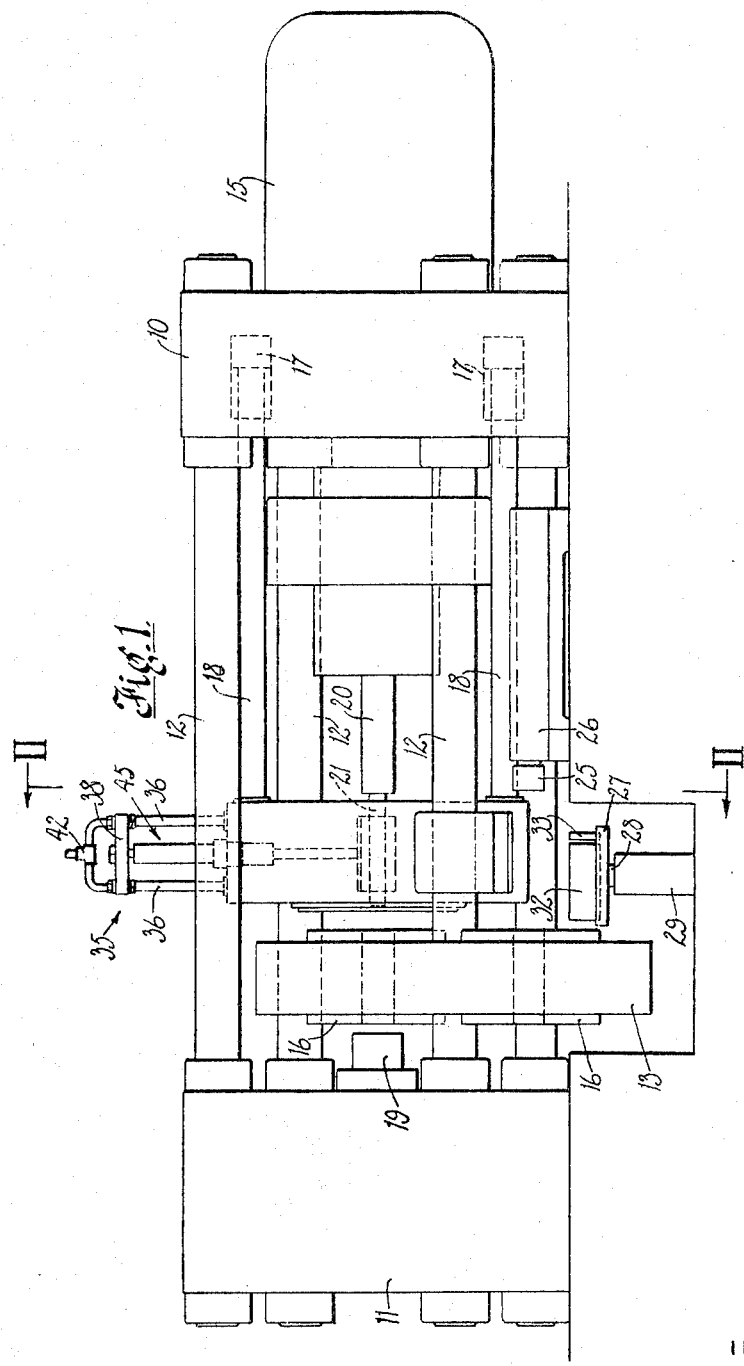

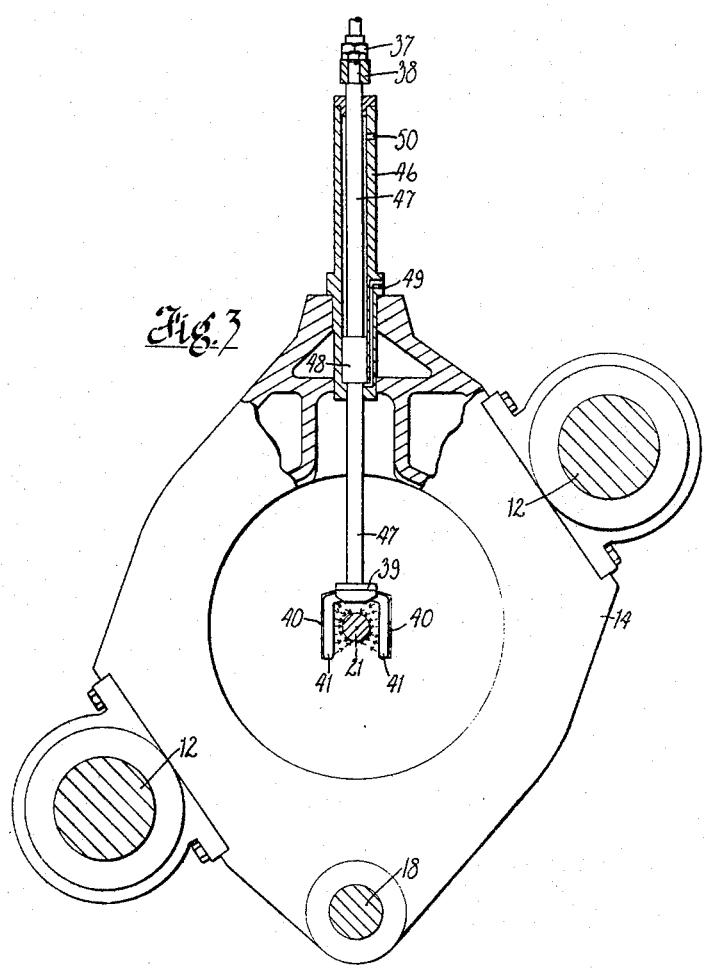

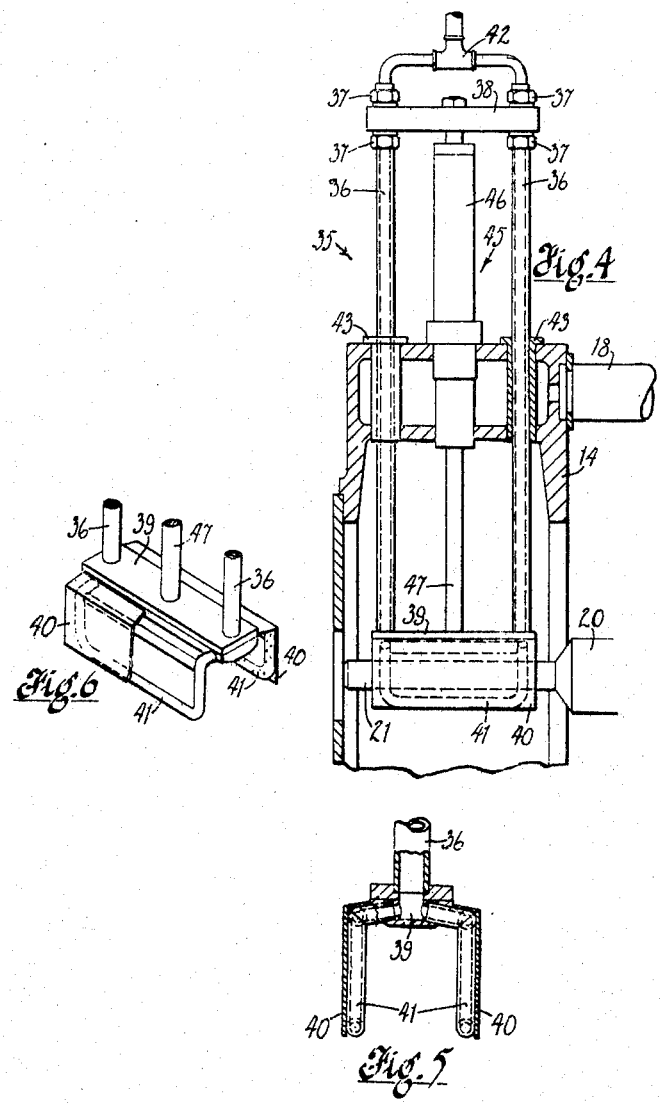

Nov. 16, 1965  R. J. ELGER  3,217,527
METAL EXTRUSION PRESS WITH MANDREL COOLING DEVICE
Filed Jan. 18, 1963  5 Sheets-Sheet 5

Fig. 7

INVENTOR
RONALD JOHN ELGER
BY
ATTORNEYS 3,217,527
METAL EXTRUSION PRESS WITH MANDREL
COOLING DEVICE
Ronald John Elger, Parkstone, Dorset, England, assignor to The Loewy Engineering Company Limited, Bournemouth, England, a corporation of Great Britain
Filed Jan. 18, 1963, Ser. No. 252,463
Claims priority, application Great Britain, Jan. 19, 1962, 1,983/62
10 Claims. (Cl. 72—263)

This invention relates to presses for the working of a hot metal billet by an elongated tool moved into a container of a press, for the purpose of performing an operation on a billet inserted into the container. The tool may be a pressing stem, a mandrel or a punch.

The cycle of operations of a metal extrusion press consists generally of the steps of loading a billet into the bore of a container extruding the billet through a die by means of a pressing stem entered into the container bore under hydraulic pressure, severing by means of a cutter or saw the extruded article from the part of the billet which remains in the container bore, (usually referred to as the "billet discard"), ejecting the discard from that bore, retracting the pressing stem and, if necessary, preparing the container bore for the next extrusion operation by cleaning, cooling or lubricating. In most conventional extrusion presses having a single container, the loading of a billet and the ejection of its discard is also effected by the pressing stem.

In presses in which tubular articles are extruded with the aid of a mandrel, the cycle of operations comprises the further steps of advancing the mandrel through a billet in the container bore and into the extrusion die prior to the extrusion of the billet by the pressing stem, and of retracting the mandrel from the container bore after the extrusion of a billet and before the severing of the discard. In presses in which the pressing stem is utilised for loading a billet and for ejecting the discard, it is further necessary for the mandrel to be retracted into the pressing stem before loading or ejecting can take place.

It is evident from the foregoing that an extrusion cycle comprises a number of steps, and that the extrusion stroke itself occupies only a relatively short period within such a cycle. It has therefore been proposed to provide an extrusion press with two or more billet containers which can be moved in succession into a working station in registry with the axis of the pressing stem, and thus be ready for an extrusion operation while the other container or containers are outside at a parking station where auxiliary operations, such as the ejection of a discard and the loading of a billet, can take place. While extrusion is in progress at one container, the other or others can be prepared for the next operation. Thus, the time elapsing between two successive extrusion strokes can be considerably shortened and the output of the press correspondingly increased.

Similar conditions exist in other types of presses for working of a hot metal billet in a container, such as a piercing press having a punch for piercing a hole in a hot billet. It has been proposed to provide a piercing press with two or more billet containers which can be moved in succession into a working station in registry with the axis of the punch.

Certain metals, such as copper, steel, nickel and their alloys, can only be extruded or pierced at relatively high temperatures. Hence, elongated tools used for the working of these metals assume correspondingly high temperatures very soon after a series of extrusion or piercing operations has been started.

In order to prevent damage to these tools due to overheating, it is necessary to cool them at frequent intervals. This applies especially to slender tools such as mandrels or punches because they are of small bulk as compared with their surface.

Various methods have been employed to cool the elongated press tools. All known methods have the disadvantage in common that the time available for cooling is short. When operations follow each other at a rapid rate, the time available between successive operations may in itself not be sufficient for effective cooling. Extra time must then be added for cooling only. This slows down the operation of the press and curtails its output.

It is an object of the invention to provide a method and means for cooling the elongated tools for presses for the hot working of metal billets by which the cooling times for the tool are greatly prolonged and the cooling generally made more effective.

According to the invention there is provided a method of operating a press for the working of hot metal billets in containers movable in succession into a working station in line with a tool of the press, for example a pressing stem, mandrel or punch, in which the loading of the containers with fresh billets is effected at an outside station offset from the working station, and a cooling fluid is applied to the tool in a cooling zone adjacent the working station and in alignment therewith as soon as the tool is retracted from a container in the working station during a cycle of the press.

In this cycle of operations the tool is not used for any auxiliary operations, such as discard-ejection and billet-loading and the tool can thus stay in the cooling zone all or most of the time between two successive working strokes of the tool during which time the tool is outside the container at the working station. This time generally corresponds to that taken to load a container with a fresh billet and move the loaded container at a parking station into the working station.

The cooling fluid may be a liquid, such as water, or a gas, such as air. Steam may also be used. The cooling fluid may be applied by pressure, for instance, in the form of sprays directed towards the tool.

According to the invention there is also provided a press for the working of hot metal billets in containers movable in succession into a working station in line with a tool of the press, for example a pressing stem, mandrel or punch, wherein billet loading means are arranged to load a container at a parking station offset from the working station, and a tool cooling device adjacent the working station and in alignment therewith is adapted to apply cooling fluid to the tool as soon as it is retracted from a container in the working station during a cycle of the press.

The positioning of the cooling device adjacent the working station is possible because in multi-container presses the means for loading of the billets into a container are placed at a parking station which is offset from the working station and the zone where cooling of the tool takes place. There is also no risk of clean billets which are ready for loading being contaminated by dirt or impurities swept off the tool by the cooling fluid.

The cooling device may be so mounted in the press as to be movable towards and away from the tool preferably in a radial direction relative to the press axis, and thereby into or out of a position in which the device can apply cooling fluid externally to the tool. The device may be in the form of a separate unit or may be incorporated into a part of the press. When operative, the device is located adjacent the working station of the containers. For instance, a mandrel-cooling device may be built into a crosshead provided in some extrusion presses for the purpose of moving the container against the die under pressure and thus establishing sealing contact between both during extrusion.

Embodiments of the invention will now be described by way of example with reference to the accompanying drawings, in which:

FIG. 1 is a side elevation view of a metal extrusion press fitted with a mandrel cooling device.

FIG. 2 is a sectional view taken on the line II—II of FIG. 1.

FIG. 3 is a partially cut-away view, on an enlarged scale, of the sealing crosshead and cooling device of the press of FIG. 1.

FIG. 4 is a side view illustrating the mounting of the cooling device in the sealing crosshead.

FIGS. 5 and 6 are views illustrating details of construction of the cooling device.

FIG. 7 is a side elevation view of a metal extrusion press fitted with a modified form of cooling device according to the invention.

FIG. 8 is a sectional view taken on the line VIII—VIII of FIG. 7.

The extrusion press of FIGS. 1 and 2 comprises a main frame consisting of a front platen 10 and a rear platen 11 interconnected by four tension columns 12. A container carrier 13 is rotatable on one of the columns 12, a sealing crosshead 14 is slidable on two of the columns 12, and a main hydraulic unit 15 is mounted on the platen 10. The carrier 13 supports two containers 16 and is movable to transfer each container in succession from a working station in the tool axis or center line of the press to a parking station near the outside of the press, and vice versa. The sealing cross head 14 is adapted to transmit to the container in the working station a thrust exerted by two hydraulic units 17 mounted on the platen 10, the two units 17 acting through push rods 18. This thrust seals the container which is in the working station against a die 19 on the platen 11. The main hydraulic unit 15 is arranged to drive a pressing stem 20 into the bore of the container which is in the working station. A mandrel 21 is retractable into the stem 20 by means not shown and can be advanced into the bore of the container which is in the working station and beyond so that the mandrel enters the die 19. The stem 20 and the mandrel 21 are both in the tool axis of the press. The sealing crosshead 14 has a large central opening, as shown in FIG. 4, for the passage therethrough of the pressing stem 20 and the mandrel 21.

A discard-ejecting and loading device is arranged at the front of the parking station and comprises a ram 25 driven by a double acting hydraulic unit 26. The ram 25 is aligned with the bore of the container which is in the parking station, and the hydraulic unit 26 is operable to advance the ram through the container bore from the front end thereof, and then subsequently withdraw the ram from the container bore.

A billet loading tray 27 is mounted on the upper end of a lifting ram 28 driven by a hydraulic unit 29 mounted on the base of the press between the container carrier 13 and the discard-ejecting and loading device 25, 26. The loading tray is movable by the ram 28 between a lower position in which a hollow billet 32 and an annular pressing disc 33 on the tray are below the ram 25 of the discard-ejecting and loading device, and an upper position in which the billet and pressing disc are co-axial with the bore of the container in the parking station. The billet and pressing disc are fed on to the tray when in its lower position by conventional conveyor means not shown.

In operation, a hollow billet 32 which has been heated to extrusion temperature and a pressing disc 33 are fed onto the loading tray 27 which is then raised into its upper position in which the billet and pressing disc are aligned with the bore of the container in the parking station. The billet and pressing disc are then entered into the container bore by the ram 25, and the carrier 13 rotated to a position in which the loaded container is in the working station. The hydraulic units 17 are then operated to impart a thrust to the sealing crosshead 14, which in turn forces the loaded container against the die 19; the mandrel 21 is advanced through the centre of the annular pressing disc and the hollow billet 32 to a position in which the mandrel projects into the die 19. The main hydraulic unit 15 is then operated to advance the pressing stem 20 into the bore of the loaded container, and thereby extrude the metal of the billet through the annular space formed between the mouth of the die 19 and the mandrel. The mandrel is preferably advanced during the extrusion operation in order to reduce the frictional force exerted on the mandrel by the extruded metal.

After the extrusion operation is completed, the used container is moved away from the die 19 by hydraulic push rods (not shown) and the mandrel is retracted from the die. During this movement of the mandrel, the pressing stem is held stationary, so that the mandrel is withdrawn into the pressing stem which acts as a stop preventing the unextruded portion of the billet and the pressing disc being entrained by the mandrel and thereby drawn through the container bore. This unextruded portion of the billet, together with the pressing disc, is hereinafter referred to as the discard. After withdrawal of the mandrel from the die the extruded product is severed from the discard by a saw (not shown) entered between the die and the used container.

During this sawing operation the pressing stem and mandrel are withdrawn from the container, the pressing stem being initially retracted at a higher speed than the mandrel so that the latter is in a fully extended position relative to the stem when it leaves the container. When the extruded product has been severed from the discard, the carrier 13 is rotated to move the used container into the parking station, and the ram 25 is advanced to expel the discard from the container, the discard falling down into a collecting tray (not shown). The ram 25 is then withdrawn to a position ready to load a fresh billet and pressing disc into the container at the start of a further cycle of the press.

To prevent the mandrel becoming overheated due to its contact with the hot metal billets upon continuous operation of the press, the mandrel is sprayed with water by a cooling device 35 during the period of each cycle when the mandrel is outside the container. As shown in FIGS. 3–6, the cooling device 35 is mounted on the sealing crosshead and projects into the central opening in the crosshead. The cooling device has a frame comprising two side tubes 36, the upper ends of which are secured by nuts 37 in openings formed in the ends of an upper crosshead 38, and the lower ends of which open into the interior of a manifold 39. Two plates 40 depend downwards from opposite sides of the manifold 39 and co-operate therewith to form a shroud, and two U-shaped tubes 41 on the inside walls of the shroud have their ends opening into the manifold. As seen in FIG. 4, the length of the shroud is substantially the same as that of the mandrel 21, so that the shroud, when in its operative position, extends substantially over the entire length of the mandrel. The upper ends of the side tubes 36 are connected by a bifurcated tube 42 to a source of cooling water, and the lower wall of the manifold and the U-shaped tubes are formed with perforations for directing into the centre of the shroud cooling water fed to the manifold through the tubes 42, 36. The shroud is thus open at one side throughout its length for the entry of a mandrel 21 into the shroud as will be presently described.

The side tubes 36 extend through bearing sleeves 43 secured in openings in the top of the sealing crosshead 14 so that the frame of the cooling device is vertically movable between an operative and inoperative position. In the former, the shroud has been lowered on to a mandrel 21 and surrounds it for that part of its circumference, as shown in FIG. 4; in the latter the shroud has been raised to the upper part of the central opening in the sealing crosshead and does not obstruct the movement of the pressing stem through the sealing crosshead. The vertical movement of the cooling device is effected by a hydraulic unit 45 having a cylinder 46 secured in an opening in the top of the sealing crosshead and a rod 47 extending through fluid tight seals in the ends of the cylinder 46, the rod 47 being formed with a piston 48 which is a close sliding fit within the cylinder 46. The lower end of the rod 47 is secured to the manifold 39 and the upper end of the rod 47 is secured to the crosshead 38. The cooling device is raised or lowered by supply of liquid under pressure through ducts 49 or 50 to the lower or upper end respectively of the cylinder 46, FIG. 3.

The press is preferably so operated that the cooling device is lowered into its operative position partially surrounding the mandrel 21, as shown in FIG. 3, and the cooling water is supplied to the device, immediately the mandrel leaves the container which is in the working station, and the cooling device is only retracted from the operative position and the supply of water turned off immediately prior to the advance movement of the mandrel into a container in the working station preparatory to an extrusion operation. In this way, cooling water can be applied to the mandrel almost throughout the interval between two working strokes of the press.

The supply of water to the cooling device may be automatically controlled, for instance, together with the lowering and lifting of the device, in such a manner that the water begins to flow when the shroud partially surrounds the mandrel, and ceases to flow before the shroud is withdrawn.

FIGS. 7 and 8 show a modified form of the extrusion press described above, in which a cooling device 54 is mounted on the base of the press and is movable upwards into an operative position for cooling the mandrel.

The press of FIGS. 7 and 8 is similar in construction to that of the press already described, and like parts are indicated by like reference numerals. In the modified press, however, the container in the working station is sealed against the die 19 by two rams 55 driven by hydraulic units mounted in separate brackets 56 which are supported on adjacent tension columns 12. The reaction force exerted on the brackets during sealing is taken by thrust rods 57 extending between the brackets 56 and the front platen 10. This arrangement leaves a clear space in front of the container which is in the working station permitting access by the cooling device 54 from below.

The cooling device 54 is mounted on the top of a lifting ram 58 driven by a hydraulic unit 59 mounted on the base of the press. The device 54 is somewhat similar in construction to the cooling device 34 and comprises an upwardly directed shroud consisting of a hollow manifold, two side plates at opposite sides of the manifold and two perforated U-shaped tubes on the inside walls of the shroud, the ends of the U-shaped device opening into the manifold. Cooling water is supplied to the manifold by a flexible pipe (not shown). The cooling device is movable by the ram 58 between an operative position in which the cooling device is arranged to apply cooling water to the mandrel when retracted from the container, and a lower inoperative position permitting passage of the pressing stem into the container in the working station.

It is a feature of the invention to apply the coolant to an elongated tool such as a mandrel 21 immediately upon its retraction from the container which is in the working station. This is shown in FIGS. 1 and 7. In both figures, the mandrel is shown inside the shroud of the cooling device. The distance of the mandrel tip from the container in the working station is substantially shorter than the length of the container and the length of the billets which are loaded into that container. This is possible because billet loading does not take place in front of the container which is in the working station, and it is therefore not necessary to withdraw the mandrel by a distance equal at least to the length of a billet. The shorter the distance by which the mandrel needs to be withdrawn, the sooner can cooling begin and the longer it can last. While this extension of time may be only in the order of a few seconds, it increases materially the effectiveness of the cooling and prolongs the life of the mandrels.

The cooling devices in the presses described above are particularly adapted for cooling the mandrel. Such cooling devices may, however, be provided with an enlarged shroud suitable for cooling the pressing stems, either in conjunction with the cooling of the mandrels or by themselves. The latter case would arise with multi-container presses in which no mandrel is provided. Furthermore, the cooling devices may be fitted to any other forms of multi-container press for the working of hot metal billets, in which a tool is entered into a container and deforms heated billets, e.g. by piercing.

What I claim is:

1. A press for the working of hot metal billets in containers movable in succession into a working station in line with an elongated press tool and a billet loading station offset with reference to said press tool, said press having a separate tool-cooling device movable from an inoperative position outside the press axis to an operative position immediately adjacent to and in alignment with the working station in the press axis, said tool-cooling device substantially surrounding said tool when in its operative position, and means to spray a cooling fluid from said cooling device on to said tool when said tool-cooling device is in operative position.

2. A press as claimed in claim 1, wherein the cooling device is movable into and out of an operative position in which the device can apply cooling fluid to the tool, said movement being radial relative to the press axis.

3. A press as claimed in claim 2 wherein the cooling device comprises a spraying head having a shroud which, in the operative position, partially surrounds the tool over at least part of its length.

4. A press as claimed in claim 3 wherein the cooling device is mounted on the base of the press and the spraying head is movable upwards into its operative position.

5. A press as claimed in claim 2, for the extrusion of the hot billets through a die supported against a platen of the press, wherein the cooling device is supported on a sealing crosshead for sealing the container in the working station against the die, the crosshead having a central opening for the passage of the tool.

6. A metal extrusion press having a billet container at a working station in the main axis of the press, an elongated tool reciprocable in that axis from a position outside the container to one inside said container, and a cooling device positionable adjacent the container for said elongated press tool, said cooling device comprising a shroud open at one side throughout its length for the entry of said tool into said shroud, means for moving said shroud relative to the axis of said tool from a retracted position into a position in which the shroud surrounds said tool for part of its circumference, and means in the interior of said shroud for applying a coolant to said tool when inside said shroud.

7. A metal extrusion press, having a plurality of billet containers, one at a working station in the main axis of the press, and another at a parking station outside the main axis of the press, means for loading a billet into a container at the parking station, means for moving said containers relative to the press axis so as to exchange their positions in said two stations, an elongated tool, the working portion of which is outside the press stem at all times and which is reciprocable in the main axis of the press from a position outside the container in the working station to one inside said container, and a cooling device for said tool, said device being positionable adjacent said container for cooling a tool after its retraction from said container by a distance shorter than the length of said container, said cooling device being movable from a position remote from the working axis of said press to a position adjacent the working axis and partially surrounding the working portion of said tool.

8. A press for the working of hot metal billets in containers movable in succession into a working station in line with an elongated working tool of the press, located in the press axis, which tool extends from a central bore in a press stem and into a parking station offset from the working station, means to load a container with a hot billet at a parking station offset from the working station, means to move said tool from a position outside a container in the working station, to a position inside said container to perform work on a hot billet therein while a container in a parking station is being loaded, means to withdraw said tool from the billet container in the working station to a position aligned with the working station and outside of the press stem, means to move a cooling device into a position partially surrounding the exposed tool and to apply a cooling fluid to the tool while the billet container loaded with a fresh billet in the parking station is moved into the working station.

9. The press of claim 8 in which the means to apply a cooling fluid to the working is operable during substantially the whole period in which the tool is outside the container in the working station.

10. A press for the hot working of metal billets, said press comprising containers movable in succession into a working station, wherein an elongated tool is entered into a container loaded with a hot billet and a billet loading station offset from the working station, means for moving said tool into and out of a container in the working station, a tool-cooling device, movable radially with reference to the press axis, means for moving said tool-cooling device into a position in which it surrounds the tool immediately after the tool is withdrawn from a container in the working station after a pressing operation and means for applying a cooling fluid to said tool while said container is moved to the loading station.

References Cited by the Examiner
UNITED STATES PATENTS

| | | | |
|---|---|---|---|
| 1,996,335 | 4/1935 | Jones et al. | 207—16 |
| 3,028,007 | 4/1962 | Arenz | 207—16 |
| 3,120,304 | 2/1964 | Pahnke et al. | 207—1 |

FOREIGN PATENTS

| | | |
|---|---|---|
| 610,796 | 3/1935 | Germany. |

CHARLES W. LANHAM, *Primary Examiner.*

MICHAEL V. BRINDISI, *Examiner.*